US008279158B2

(12) United States Patent
Lowles et al.

(10) Patent No.: US 8,279,158 B2
(45) Date of Patent: Oct. 2, 2012

(54) DUAL-FUNCTION LIGHT GUIDE FOR LCD BACKLIGHT

(75) Inventors: Robert J. Lowles, Waterloo (CA); Marc A. Drader, Kitchener (CA); James Robinson, Elmira (CA)

(73) Assignee: Research In Motion Limited, Waterloo, Ontario (CA)

( * ) Notice: Subject to any disclaimer, the term of this patent is extended or adjusted under 35 U.S.C. 154(b) by 960 days.

(21) Appl. No.: 11/066,451

(22) Filed: Feb. 28, 2005

(65) Prior Publication Data

US 2006/0192749 A1 Aug. 31, 2006

(51) Int. Cl.
G09G 3/36 (2006.01)

(52) U.S. Cl. .......................... 345/102; 345/209; 345/690

(58) Field of Classification Search .......... 345/102–104, 345/209, 690
See application file for complete search history.

(56) References Cited

U.S. PATENT DOCUMENTS

| | | | |
|---|---|---|---|
| 4,826,273 A * | 5/1989 | Tinder et al. ................... 362/488 |
| 5,450,613 A * | 9/1995 | Takahara et al. ............... 455/517 |
| 5,490,005 A | 2/1996 | Jueliger |
| 6,209,011 B1 * | 3/2001 | Vong et al. ..................... 708/112 |
| 6,753,842 B1 * | 6/2004 | Williams et al. ............... 345/102 |
| 6,798,395 B1 | 9/2004 | Yamauchi et al. |
| 7,042,341 B2 * | 5/2006 | McMahon ............... 340/426.13 |
| 7,352,930 B2 | 4/2008 | Lowles |
| 2003/0058657 A1 * | 3/2003 | Rogers et al. ................. 362/555 |

FOREIGN PATENT DOCUMENTS

| | | |
|---|---|---|
| EP | 1 303 113 A | 4/2003 |
| EP | 1505567 | 2/2005 |
| JP | 02053040 | 2/1990 |
| JP | 06 130386 A | 5/1994 |
| JP | 11 260572 A | 9/1999 |
| JP | 2001-004978 | 1/2001 |
| JP | 2002-072992 | 3/2002 |
| JP | 2002 300233 A | 11/2002 |
| JP | 2003-021821 | 1/2003 |
| JP | 2003 198668 A | 11/2003 |
| JP | 2004 309973 A | 4/2004 |
| JP | 2004-260269 | 9/2004 |

OTHER PUBLICATIONS

EPO Examination Report issued Aug. 15, 2011, in EP Application No. 07 109 225.8-1228 (5 pages).

(Continued)

*Primary Examiner* — Kevin M Nguyen
*Assistant Examiner* — Cory Almeida
(74) *Attorney, Agent, or Firm* — Finnegan, Henderson, Farabow, Garrett & Dunner, LLP

(57) ABSTRACT

A portable computing device includes a housing having an external surface, and an event notifier, a display device, and a light controller disposed within the housing. The event notifier includes an event notification lamp, and a light conduit terminating at the external surface for conveying light between the event notification lamp and the external surface. The display device includes illumination means for improved visualization of information rendered on the display device. The light controller is coupled to the event notifier and the illumination means. The light controller is configured to determine the intensity of ambient light external to the housing via the light conduit, and to adjust the intensity of light emitted by the illumination means in accordance with the determined ambient light intensity.

12 Claims, 9 Drawing Sheets

OTHER PUBLICATIONS

EPO Communication issued Jul. 14, 2011, in EP Application No. 10 183 277.2-1228 (5 pages).
China First Office Action issued Apr. 25, 2011, in Application No. 201010251059.X and English translation (7 pages).
China Office Action issued Sep. 19, 2008, in Application No. 2006100095492 and English translation (7 pages).
China Second Office Action issued May 22, 2009, in Application No. 2006100095492 and English translation (6 pages).
China Third Office Action issued Sep. 11, 2009, in Application No. 2006100095492 and English translation (6 pages).
China Fourth Office Action issued Dec. 25, 2009, in Application No. 2006-100095492 and English translation (6 pages).
Japan Official Action issued Aug. 9, 2011, in Application No. 2006-049377 and English translation (10 pages).
Mexico Office Action issued Apr. 27, 2011, in Application No. MX/a/2008/015943 (3 pages).
Japan Office Action issued Jan. 13, 2012, in Application No. 2006-049377 and English translation (5 pages).
Canada Office Action issued Oct. 28, 2011, in Application No. 2,538,071 (3 pages).

* cited by examiner

DUAL-FUNCTION LIGHT GUIDE FOR LCD BACKLIGHT

FIELD OF THE INVENTION

The invention described herein relates to a mechanism for controlling visualization of information rendered on the display device of a portable computing device. In particular, the invention described herein relates to a method and apparatus for controlling the backlight intensity of a liquid crystal display (LCD), based on the intensity of ambient light detected at the portable computing device.

BACKGROUND OF THE INVENTION

The conventional portable computing device, such as a personal data assistant (PDA) or wireless telephone, has a liquid crystal display (LCD), a LCD backlight, and a keyboard/keypad. Typically, the display backlight is enabled when the device is powered on or when a key on the keyboard/keypad is depressed. The intensity of light produced by the backlight is factory set to a fixed level that allows the information displayed on the LCD to be viewable in moderate ambient light levels. However, the backlight tends to be excessively bright at dim ambient light levels, and insufficiently bright at very bright ambient light levels. In both of these situations, the clarity of the information displayed on the LCD is comprised. Accordingly, attempts have been made to make the information displayed on a LCD more readily viewable over a wider range of ambient light levels.

For instance, Keiji (Patent Abstracts of Japan, Pub. No. 11-260572) describes a lighting system that changes the illumination level of the LCD, based on the intensity of ambient light detected. In one embodiment, the lighting system comprises a liquid crystal display having a Light Emitting Diode (LED) backlight and a light guide; a light sensor disposed at an end face of the light guide; and control means for varying the intensity of light emitted by backlight. The light sensor measures the luminous energy at two or more wavelengths. The control means determines the energy of light measured by the light sensor, while momentarily setting the radiant output energy of the backlight to zero. The control means then sets the radiant output energy of the backlight based on the energy of light so measured.

Since the light sensor is disposed within the LCD, the light sensor is not prone to erroneous intensity measurements resulting from dirt contaminating the optical surface of the sensor. However, incorporating the light sensor into the LCD increases the manufacturing cost of the LCD. Therefore, there remains a need for an improved mechanism for rendering the information displayed on a LCD more readily viewable over a wide range of ambient light levels.

SUMMARY OF THE INVENTION

By way of overview, there is described herein an illumination control mechanism for the display device of a portable computing device, that uses a dual-function light conduit to automatically adjust the intensity of light emitted by the display device in accordance with the intensity of ambient light external to the portable computing device.

According to one aspect of the invention, there is provided a portable computing device that includes a housing having an external surface, an event notifier, a display device, and a light controller. The event notifier includes an event notification lamp disposed within the housing, and a light conduit terminating at the external surface for conveying light between the event notification lamp and the external surface. The display device is supported by the housing and includes illumination means for improved visualization of information rendered on the display device. The light controller is coupled to the event notifier and the illumination means. The light controller is configured to determine the intensity of ambient light external to the housing via the light conduit, and to adjust the intensity of light emitted by the illumination means in accordance with the determined ambient light intensity.

According to another aspect of the invention, there is provided a method of controlling visualization of information rendered on the display device of a portable computing device. The portable computing device includes a housing, and an event notifier and a display device disposed within the housing. The event notifier comprises an event notification lamp and a light conduit for conveying light between the event notification lamp and an external surface of the housing. The method involves the steps of (1) via the light conduit, determining an intensity of ambient light external to the housing; and (2) adjusting the intensity of light emitted by the display device in accordance with the determined ambient light intensity.

Preferably, the light controller is configured to determine the ambient light intensity during an interval when the intensity of the emitted light is at a minimum. Further, preferably the light controller is configured to determine the ambient light intensity by measuring the ambient light intensity during the interval in response to an event at the portable computing device, and, after the interval, to adjust the intensity of light produced by the illumination means.

In one implementation of the invention, the light controller is configured to determine the ambient light intensity by extinguishing the event notification lamp for an interim period during the interval, and by measuring the intensity of light in the light conduit during the interim period. Further, preferably the light conduit comprises a light guide, the event notifier further includes a light sensor coupled to the light guide, and the light controller is configured to determine the ambient light intensity by measuring the intensity of the light in the light guide with the light sensor.

BRIEF DESCRIPTION OF THE DRAWINGS

The invention will now be described, by way of example only, with reference to the accompanying drawings, in which.

DETAILED DESCRIPTION OF THE PREFERRED EMBODIMENT

Figure 1:
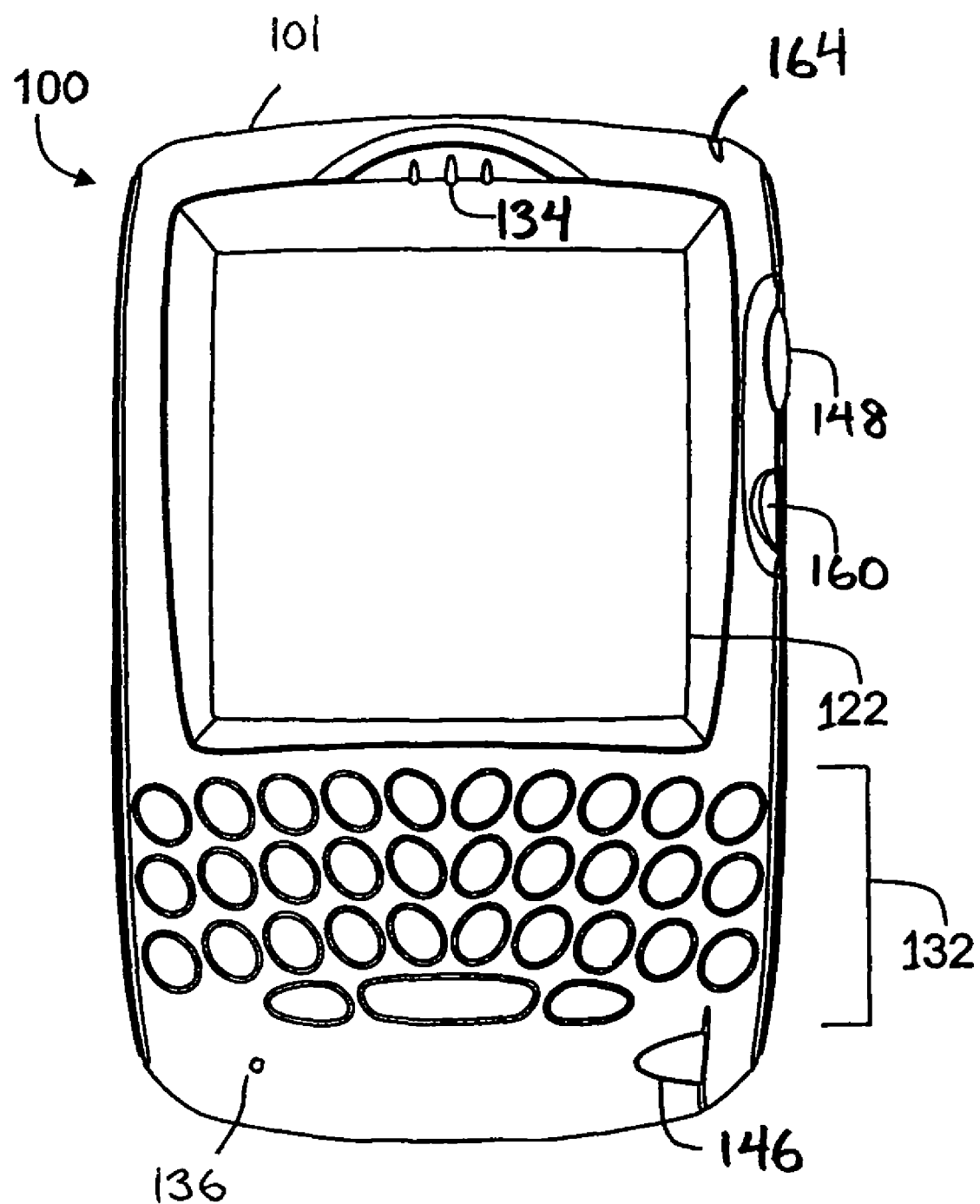
FIG. 1 is a front plan view of the portable computing device, according the invention described herein.

Referring now to FIG. 1, there is shown a portable computing device, denoted generally as 100, provided according to one aspect of the invention. The portable computing device 100 includes a display 122, a function key 146, and data processing means 102 (not shown) disposed within a common housing 101. The display 122 comprises a backlit display having a variable-intensity backlight, and the data processing means 102 is coupled to the backlight of the display 122 and controls the intensity of light produced by the backlight.

In one embodiment, the backlit display 122 comprises a backlit transmissive LCD display, and the function key 146 operates as a combination power on/off switch and display backlight on/off switch. Alternately, in another embodiment, the backlit display 122 comprises a backlit reflective or trans-reflective LCD display, and the function key 146 operates as a master backlight on/off switch.

Figure 2:
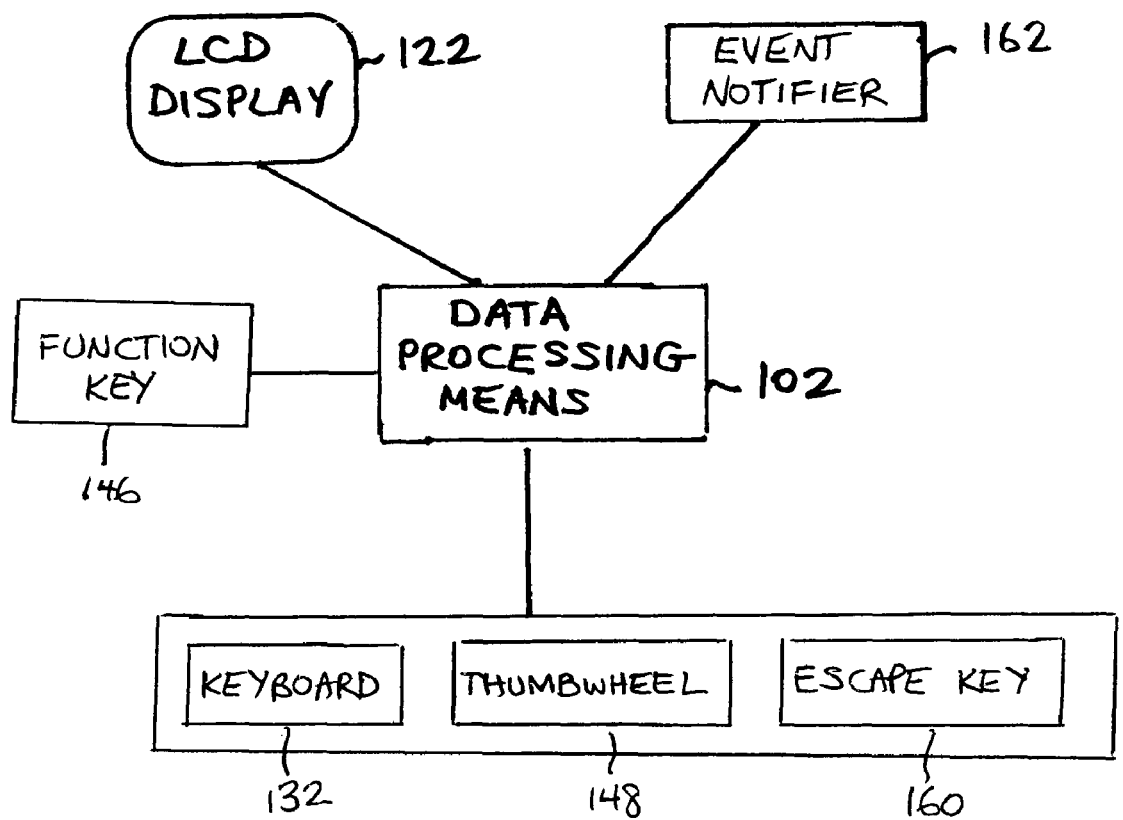
FIG. 2 is a schematic view of the portable computing device, depicting the communication pathways existing between the data processing means, the event notifier, the LCD display, and the data input means of the portable computing device depicted in FIG. 1.

As shown in FIG. 2, the data processing means 102 of the portable computing device 100 is in communication with the display 122 and the event notifier 162. As will be described, the data processing means 102 comprises a microprocessor 138, and a memory 124, 126 (disposed within the housing 101). The memory 124, 126 carries computer processing instructions which, when accessed from the memory 124, 126 and executed by the microprocessor 138, cause the data processing means to perform the method which will be described in further detail below.

In addition to the display 122 and the event notifier 162, the portable computing device 100 includes user data input means for inputting data to the data processing means. Further, the data processing means 102 is in communication with the function key 146 and the user data input means. Preferably, the user data input means includes a keyboard 132, a thumbwheel 148 and an escape key 160. Preferably, the keyboard 132 includes a keyboard backlight. Further, preferably the backlight for the keyboard 132 is operable independently of the backlight for the display 122.

In a first embodiment, the portable computing device 100 includes a cavity (not shown) opening into the interior of the housing 101 from the exterior surface of the housing 101. Preferably, the cavity terminates at the exterior housing surface proximate the display 122. In addition, if the portable computing device 100 has telephony capabilities, preferably the portable computing device 100 includes a speaker grille 134 and a microphone grille 136, as shown in FIG. 1. Typically, the speaker and microphone grilles 134, 136 each comprise one or more apertures formed in the housing 101.

Further, as shown in FIG. 1, preferably the portable computing device 100 includes a translucent lens 164 secured to the exterior housing surface and enclosing the cavity. As shown, the lens 164 is disposed proximate the display 122. As will be explained, this position allows the data processing means 102 to detect the intensity of ambient light falling on the display 122. Preferably, the lens 164 is disposed above the display 122, adjacent the uppermost end of the portable computing device 100. Optionally, the lens 164 may be disposed below the display 122, between the lowermost end of the display 122 and the uppermost end of the keyboard 132.

Figure 3:
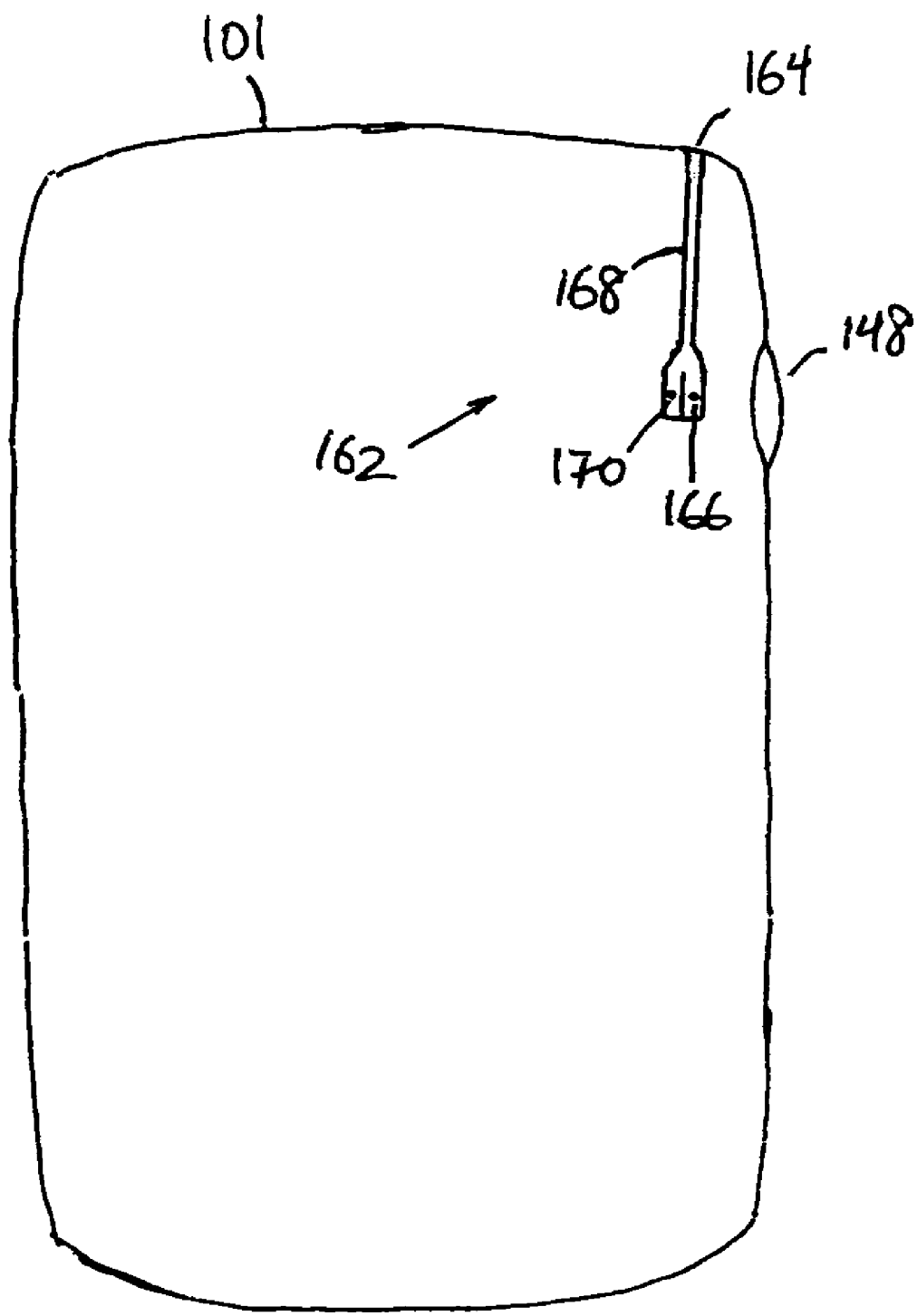
FIG. 3 is a schematic view of the interior of the portable computing device, depicting the event notification lamp, the light conduit and the light sensor of one embodiment of the event notifier.

As shown in FIG. 3, in the first embodiment the event notifier 162 comprises an event notification lamp 166 and a light conduit 168 disposed within the housing 101. Typically, the event notification lamp 166 comprises a light emitting diode (LED). The light conduit 168 is typically disposed within the aforementioned cavity. Further, the light conduit 168 is optically-coupled at one end to the event notification lamp 166, and terminates at the external surface of the housing 101 in order to convey light between the event notification lamp 166 and the external surface. Preferably, the light conduit 168 comprises a light guide that extends between the event notification lamp 166 and the lens 164. Alternately, the light conduit 168 may simply comprise the aforementioned cavity, and extends between the event notification lamp 166 and the speaker or microphone grille 134, 136.

In addition to the event notification lamp 166 and the light conduit 168, preferably the event notifier 162 also includes an ambient light sensor 170 optically-coupled to the light conduit 168 for measuring the intensity of the light in the light conduit 168. As will be appreciated, since the light conduit 168 terminates at the external surface of the housing 101, the light sensor 170 is able to provide an indication of the intensity of ambient light external to the housing 101. Further, since the light conduit 168 typically terminates at the exterior housing surface proximate the display 122, the light sensor 170 is able to provide an indication of the intensity of ambient light falling on the display 122.

It should be understood, however, that the light sensor 170 of the foregoing embodiment is not an essential feature of the invention. Rather, in one variation, the light sensor 170 is eliminated, and the intensity of ambient light is measured via a suitable event notification lamp 166.

Figure 4:
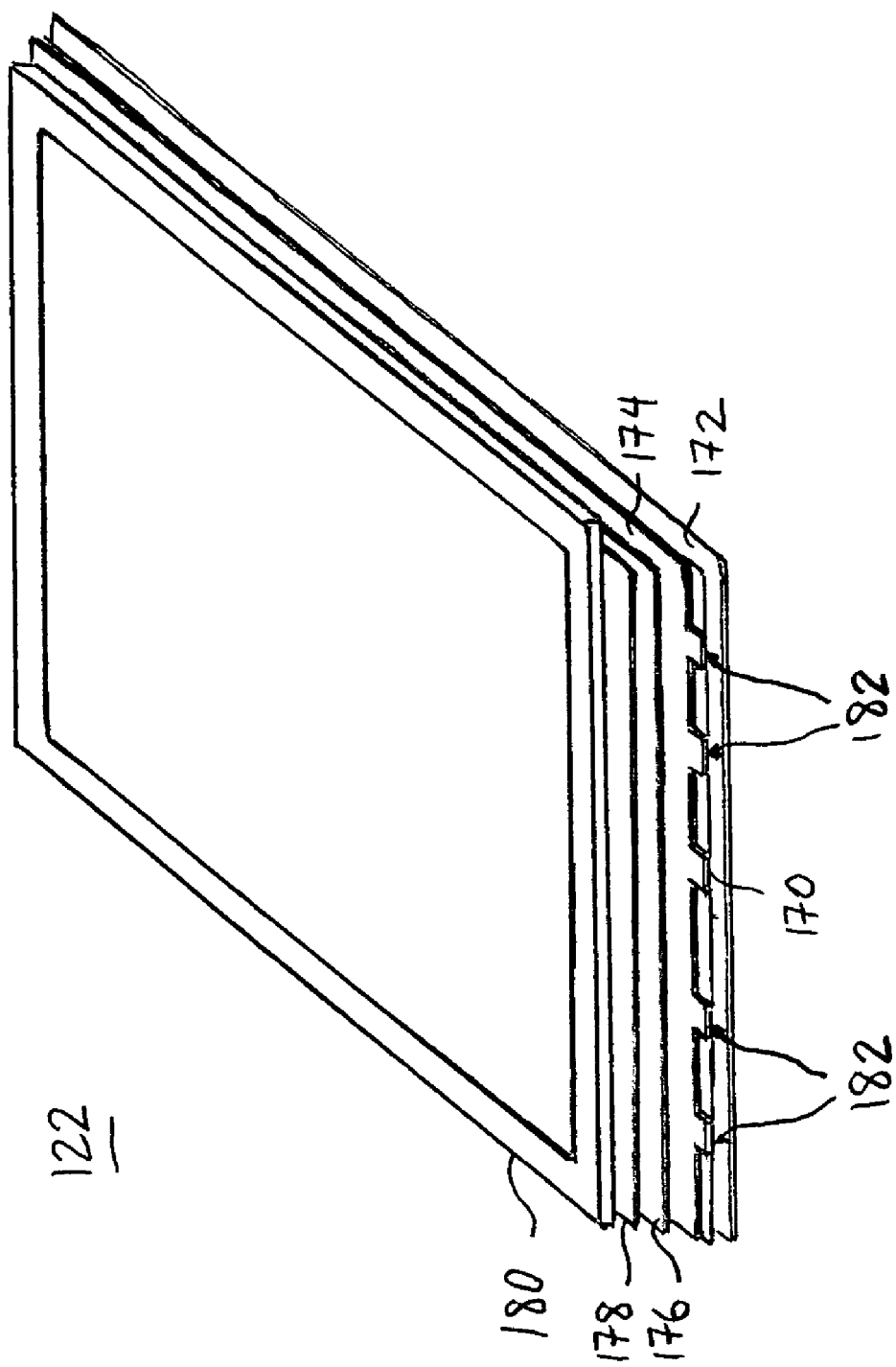
FIG. 4 is an exploded perspective view of another embodiment of the invent notifier, in which the light conduit and the light sensor of the event notifier are integrated with the light guide of the LCD display.

A second embodiment of the invention is depicted in FIG. 4, in which the event notifier 162 is integrated with the display 122. As shown, the display 122 comprises a planar light diffusing film 176, a planar light reflecting layer 172, a planar light guide 174 disposed between the light diffusing film 176 and the light reflecting layer 172, a planar liquid crystal module 180, a planar light intensifying layer 178 disposed between the light diffusing film 176 and the liquid crystal module 180, and a plurality of backlight LEDs 182 optically-coupled to one edge of the light guide. The light reflecting layer 172, the light guide 174, the light diffusing film 176, the light intensifying layer 178, the liquid crystal module 180, and the backlight LEDs 182 are all retained within and supported by the housing 101 of the portable computing device 100. The liquid crystal module 180 is electrically-coupled to the data processing means 102 to thereby allow the data processing means 102 to present information on the display 122.

In the second embodiment, the event notification lamp 166 and the light conduit 168 of the event notifier 162 are not required. Although, in the second embodiment, the event notifier 162 includes the ambient light sensor 170, the ambient light sensor 170 is optically-coupled to the light guide 174 of the display 122. As shown, preferably the ambient light sensor 170 is coupled to the same edge of the light guide 174 as the backlight LEDs 182, although other orientations/configurations are intended to be encompassed by the invention described herein. The light guide 174 acts as a light conduit that not only directs light from the backlight LEDs 182 to the liquid crystal module 178 (thereby illuminating the information depicted on the liquid crystal module 178), but also directs the ambient light that falls on the display 122 towards the ambient light sensor 170. As will become apparent, this embodiment allows the data processing means 102 to more accurately detect the intensity of ambient light falling on the display 122.

Typically, the portable computing device 100 is a two-way wireless communication device having at least voice and data communication capabilities. Further, preferably the portable computing device 100 has the capability to communicate with other computer systems on the Internet. Depending on the exact functionality provided, the wireless portable computing device 100 may be referred to as a data messaging device, a two-way pager, a wireless e-mail device, a cellular telephone with data messaging capabilities, a wireless Internet appliance, or a data communication device, as examples.

Figure 5:
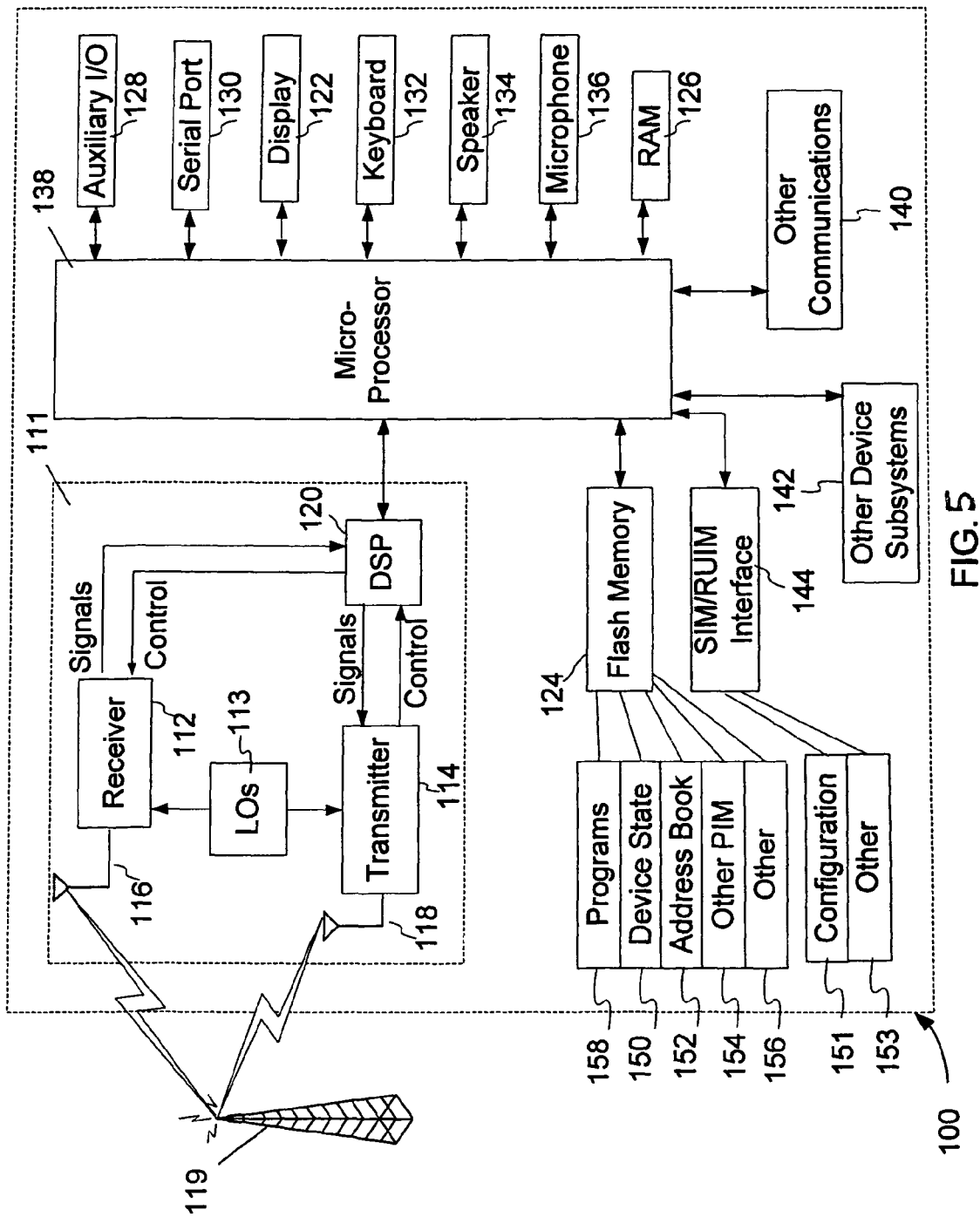
FIG. 5 is a schematic view depicting functional details of the portable computing device.

FIG. 5 depicts functional details of the portable computing device 100. Where the portable computing device 100 is enabled for two-way communication, it will incorporate a communication subsystem 111, including both a receiver 112 and a transmitter 114, as well as associated components such as one or more, preferably embedded or internal, antenna elements 116 and 118, local oscillators (LOs) 113, and a processing module such as a digital signal processor (DSP) 120. As will be apparent to those skilled in the field of communications, the particular design of the communication subsystem 111 will be dependent upon the communication network in which the device is intended to operate. For example, the portable computing device 100 may include a communication subsystem 111 designed to operate within the Mobitex™ mobile communication system, the DataTAC™ mobile communication system, GPRS network, UMTS network, EDGE network or CDMA network.

Network access requirements will also vary depending upon the type of network 119. For example, in the Mobitex and DataTAC networks, the portable computing device 100 is registered on the network using a unique identification number associated with each portable computing device. In UMTS and GPRS networks, and in some CDMA networks, however, network access is associated with a subscriber or user of the portable computing device 100. A GPRS portable computing device therefore requires a subscriber identity module (SIM) card in order to operate on a GPRS network, and a RUIM in order to operate on some CDMA networks. Without a valid SIM/RUIM card, a GPRS/UMTS/CDMA portable computing device may not be fully functional. Local or non-network communication functions, as well as legally required functions (if any) such as "911" emergency calling, may be available, but the portable computing device 100 will be unable to carry out any other functions involving communications over the network. The SIM/RUIM interface 144 is normally similar to a card-slot into which a SIM/RUIM card can be inserted and ejected like a diskette or PCMCIA card. The SIM/RUIM card can have approximately 64K of memory and hold many key configuration 151, and other information 153 such as identification, and subscriber related information.

When required network registration or activation methods have been completed, the portable computing device 100 may send and receive communication signals over the network 119. Signals received by antenna 116 through communication network 119 are input to receiver 112, which may perform such common receiver functions as signal amplification, frequency down conversion, filtering, channel selection and the like, and in the example system shown in FIG. 5, analog to digital (A/D) conversion. A/D conversion of a received signal allows more complex communication functions such as demodulation and decoding to be performed in the DSP 120. In a similar manner, signals to be transmitted are processed, including modulation and encoding for example, by DSP 120 and input to transmitter 114 for digital to analog conversion, frequency up conversion, filtering, amplification and transmission over the communication network 119 via antenna 118. DSP 120 not only processes communication signals, but also provides for receiver and transmitter control. For example, the gains applied to communication signals in receiver 112 and transmitter 114 may be adaptively controlled through automatic gain control algorithms implemented in DSP 120.

The portable computing device 100 preferably includes a microprocessor 138 which controls the overall operation of the device. Communication functions, including at least data and voice communications, are performed through communication subsystem 111. Microprocessor 138 also interacts with further device subsystems such as the display 122, flash memory 124, random access memory (RAM) 126, auxiliary input/output (I/O) subsystems 128, serial port 130, keyboard 132, speaker 134, microphone 136, a short-range communications subsystem 140 and any other device subsystems generally designated as 142.

Some of the subsystems shown in FIG. 5 perform communication-related functions, whereas other subsystems may provide "resident" or on-device functions. Notably, some subsystems, such as keyboard 132 and display 122, for example, may be used for both communication-related functions, such as entering a text message for transmission over a communication network, and device-resident functions such as a calculator or task list.

Operating system software used by the microprocessor 138 is preferably stored in a persistent store such as flash memory 124, which may instead be a read-only memory (ROM) or similar storage element (not shown). Those skilled in the art will appreciate that the operating system, specific device applications, or parts thereof, may be temporarily loaded into a volatile memory such as RAM 126. Received communication signals may also be stored in RAM 126.

As shown, the flash memory 124 can be segregated into different areas for both computer programs 158 and program data storage 150, 152, 154 and 156. These different storage types indicate that each program can allocate a portion of flash memory 124 for their own data storage requirements.

Microprocessor 138, in addition to its operating system functions, preferably enables execution of software applications on the portable computing device. The operating system software and the software applications comprises computer processing instructions which, when accessed from the flash memory 124 and the RAM 126 and executed by the microprocessor 138, define the aforementioned data processing means 102. A predetermined set of applications that control basic operations, including at least data and voice communication applications for example, will normally be installed on the portable computing device 100 during manufacturing.

Figure 6:
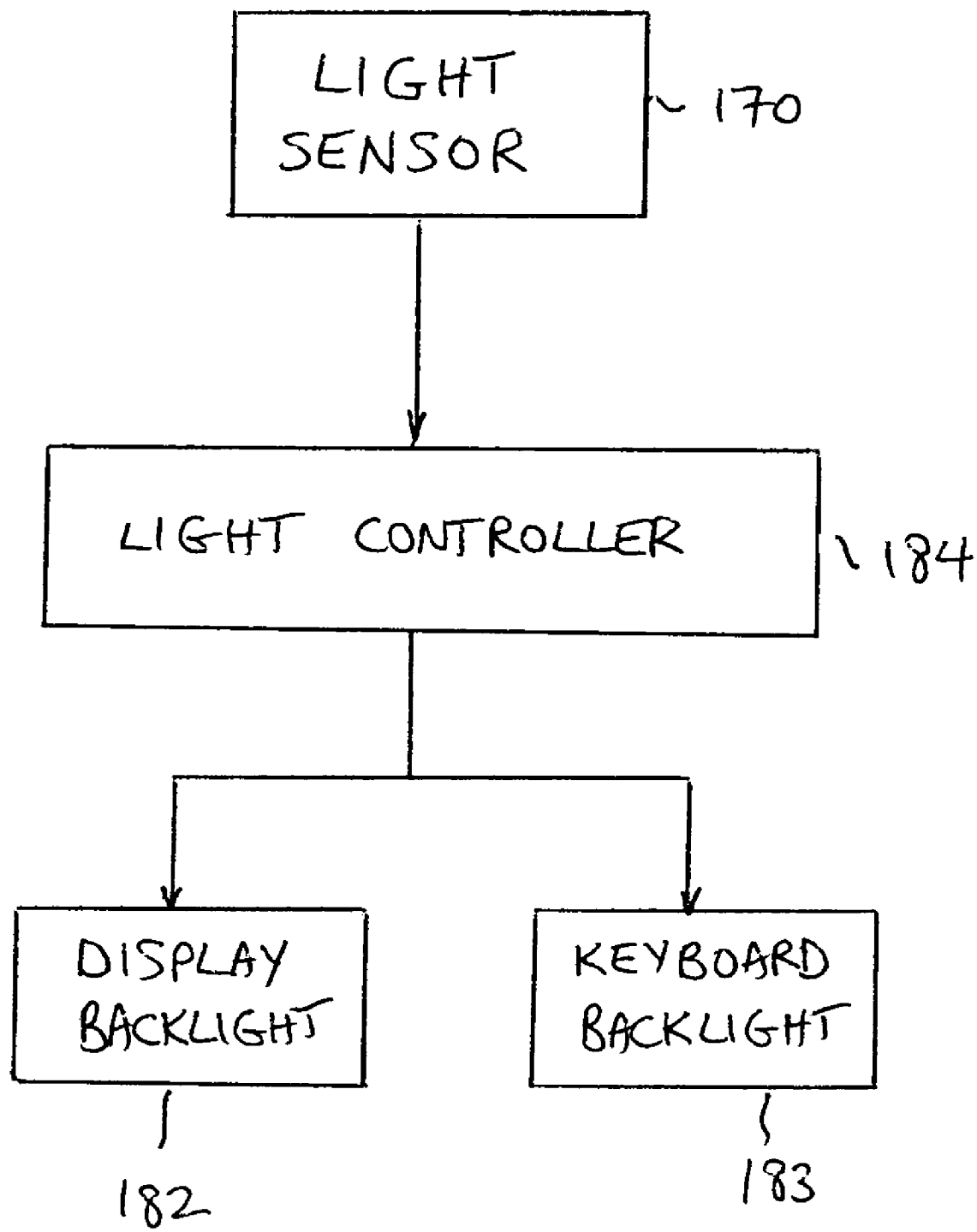
FIG. 6 is a schematic view depicting the communication pathways existing between the light controller, the event notifier, the display device backlight and the keyboard backlight of the portable computing device.

Another such software application comprises a light controller 184 that controls the backlight 182 of the backlit display 122. As shown in FIG. 6, the light controller 184 is in communication with the light sensor 170, and the display backlight 182 and the keyboard backlight 183. Also, in the first embodiment of the event notifier 162, the light controller 184 is in communication with the event notification lamp 166. The light controller 184 uses the light sensor 170 to determine the intensity of ambient light external to the housing 101. Also, the light controller 184 is configured to adjust the intensity of light emitted by the display backlight 182 and the keyboard backlight 183 in accordance with the determined ambient light intensity.

The light controller 184 also controls the illumination of the event notification lamp 166 in accordance with one or more predefined events. For instance, the light controller 184 may be configured to flash the event notification lamp 166 when the data processing means 102 is in a sleep state. The light controller 184 may be configured to flash the event notification lamp 166 when an e-mail message or a telephone call is received at the portable computing device 100. Other suitable events are intended to be encompassed by the invention described herein.

Returning again to FIG. 5, another software application may be a personal information manager (PIM) application having the ability to organize and manage data items relating to the user of the portable computing device such as, but not limited to, e-mail, calendar events, voice mails, appointments, and task items. Naturally, one or more memory stores would be available on the portable computing device to facilitate storage of PIM data items. Such PIM application would preferably have the ability to send and receive data items, via the wireless network 119.

In a preferred embodiment, the PIM data items are seamlessly integrated, synchronized and updated, via the wireless network 119, with the user's corresponding data items stored or associated with a host computer system. Further applications may also be loaded onto the portable computing device 100 through the network 119, an auxiliary I/O subsystem 128, serial port 130, short-range communications subsystem 140 or any other suitable subsystem 142, and installed by a user in the RAM 126 or preferably a non-volatile store (not shown) for execution by the microprocessor 138. Such flexibility in application installation increases the functionality of the device and may provide enhanced on-device functions, communication-related functions, or both. For example, secure communication applications may enable electronic commerce functions and other such financial transactions to be performed using the portable computing device 100.

In a data communication mode, a received signal such as a text message or web page download will be processed by the communication subsystem 111 and input to the microprocessor 138, which preferably further processes the received signal for output to the display 122, or alternatively to an auxiliary I/O device 128. A user of the portable computing device 100 may also compose data items such as email messages for example, using the keyboard 132, which is preferably a complete alphanumeric keyboard or telephone-type keypad, in conjunction with the display 122 and possibly an auxiliary I/O device 128. Such composed items may then be transmitted over a communication network through the communication subsystem 111.

For voice communications, overall operation of the portable computing device 100 is similar, except that received signals would preferably be output to a speaker 134 and signals for transmission would be generated by a microphone 136. Alternative voice or audio I/O subsystems, such as a voice message recording subsystem, may also be implemented on the portable computing device 100. Although voice or audio signal output is preferably accomplished primarily through the speaker 134, display 122 may also be used to provide an indication of the identity of a calling party, the duration of a voice call, or other voice call related information for example.

Serial port 130 in FIG. 5, would normally be implemented in a personal digital assistant (PDA)-type portable computing device for which synchronization with a user's desktop computer (not shown) may be desirable, but is an optional device component. Such a port 130 would enable a user to set preferences through an external device or software application and would extend the capabilities of the portable computing device 100 by providing for information or software downloads to the portable computing device 100 other than through a wireless communication network. The alternate download path may for example be used to load an encryption key onto the device through a direct and thus reliable and trusted connection to thereby enable secure device communication.

Other communications subsystems 140, such as a short-range communications subsystem, is a further optional component which may provide for communication between the portable computing device 100 and different systems or devices, which need not necessarily be similar devices. For example, the subsystem 140 may include an infrared device and associated circuits and components or a Bluetooth™ communication module to provide for communication with similarly enabled systems and devices.

Figure 7:
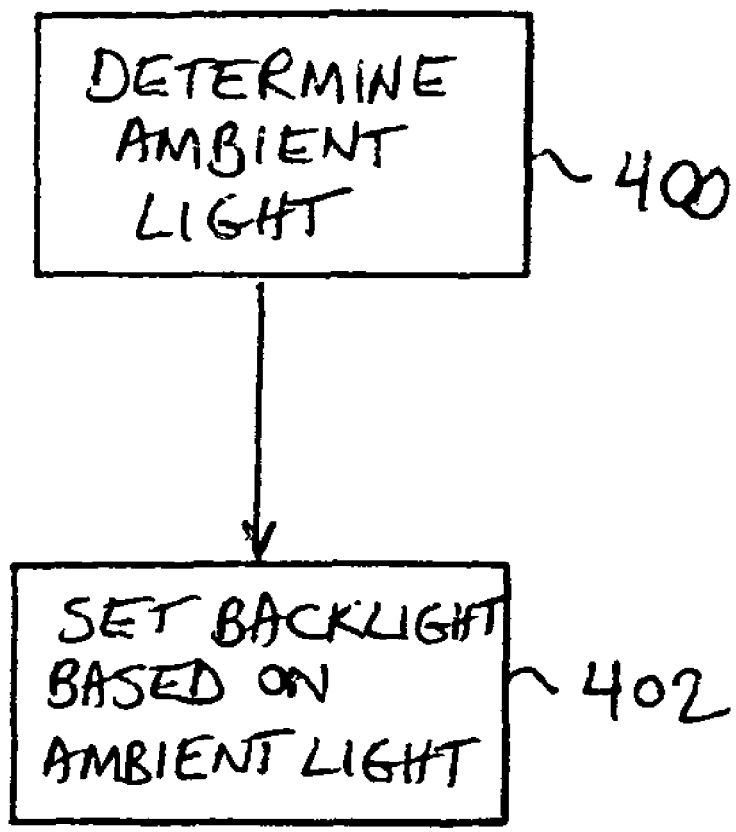
FIG. 7 is a flowchart depicting, by way of overview, the method of controlling the illumination of the display device implemented in the portable computing device.

FIG. 7 is a flow chart that depicts, by way of overview, the sequence of steps performed by the light controller 184 according to the invention. Initially, the portable computing device 100 is in an inactive state, and the display backlight 182 and the keyboard backlight 183 are at a minimum/off intensity. Typically, the light controller 184 flashes the event notification lamp 166 to notify the user that the portable computing device 100 is not off, but is instead inactive. The portable computing device 100 remains in the inactive state until the data processing means 102 detects a data event. Suitable data events include activity at the data input means (pressing a key on the keyboard 132, rotating the thumbwheel 148 or depressing the escape key 160), an incoming message (such as a telephone call or e-mail message), or a predetermined event (such as a scheduled meeting or task).

When the portable computing device 100 exits from the inactive state, at step 400 the light controller 184 determines the ambient light level at the computing device 100, via the ambient light sensor 170. The light controller 184 determines the ambient light intensity by measuring the intensity of the light in the light guide 168, 174 with the light sensor 170.

Preferably, the light controller 184 is configured to determine the ambient light intensity during an interval when the intensity of the light emitted by the display and keyboard backlights 182, 183 is at a minimum. Further, preferably the light controller 184 is configured to determine the ambient light intensity during an interval when the light controller 184 has extinguished the event notification lamp 166, for example between flashes of the event notification lamp 166.

At step 402, the light controller 184 sets the intensity of the display backlight 182 to an intensity level that is sufficient for viewing information on the display 122 under the determined lighting conditions. Typically, this latter step involves automatically setting the intensity of light to a first intensity when the determined light level is greater than a first level, and automatically setting the intensity of light to a second intensity less than the first intensity when the determined light level is less than the first level.

In one embodiment, the backlit display 122 is a transmissive LCD display, and the intensity adjusting step also involves setting the intensity of light to a third intensity less than the second intensity when the determined light level is less than a second level, the second level being lower than the first level. In another embodiment, the backlit display 122 is a reflective or trans-reflective LCD display, and the intensity adjusting step also involves setting the intensity of light to a third intensity less than the second intensity when the determined light level is greater than a second level, the second level being greater than the first level.

In one variation of these embodiments, the intensity adjusting step involves illuminating the keyboard 132 at a first candela level when the determined light level is greater than the first level, and illuminating the keyboard 132 at a second candela level less than the first candela level when the determined light level is less than the first level. Further, the intensity adjusting step involves illuminating the keyboard 132 at a third candela level less than the second candela level when the determined light level is greater than the first level.

Figure 8:
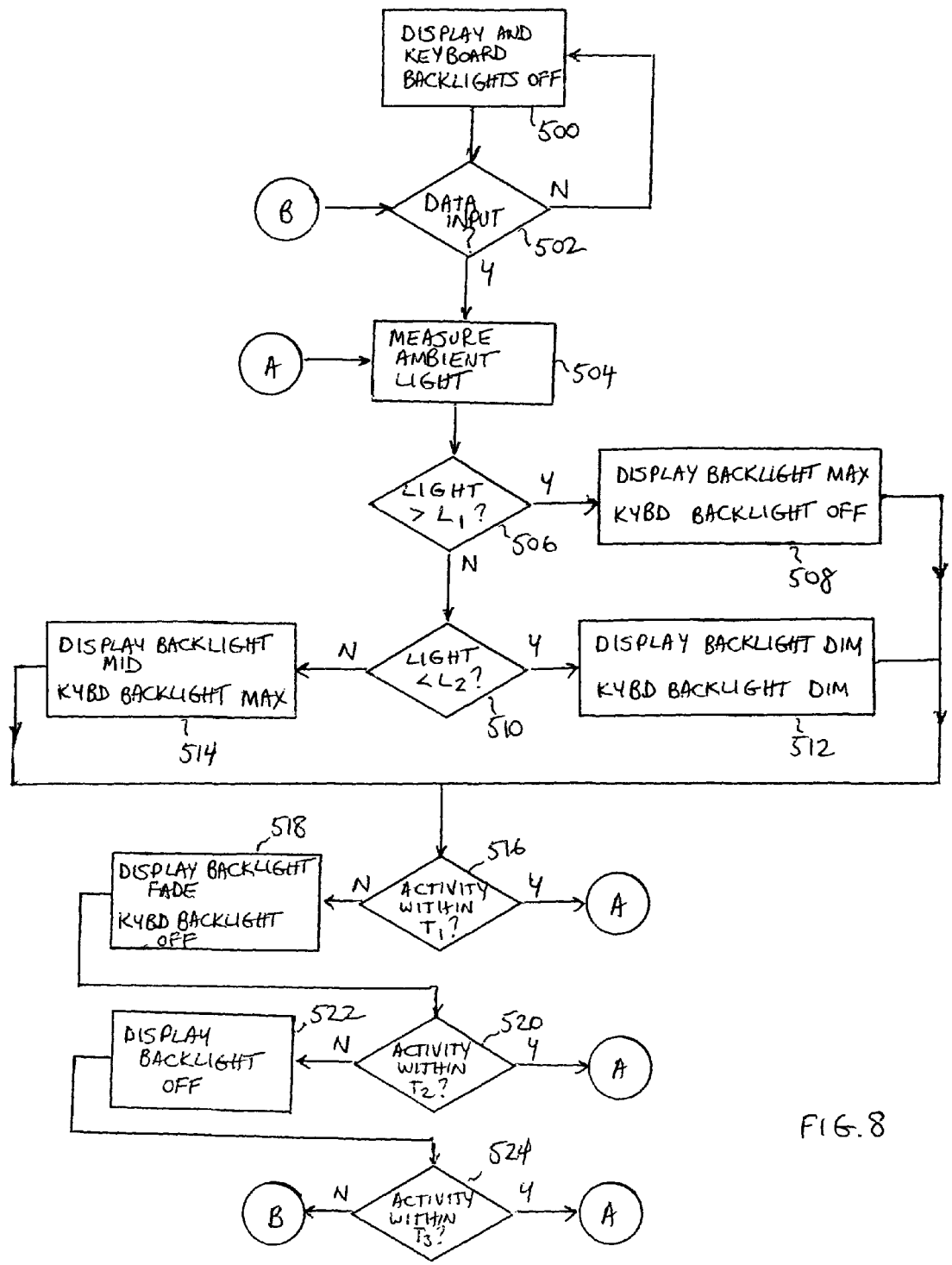
FIGS. 8a and 8b together comprise a flowchart depicting, in detail, the method of illumination control of the display device implemented in the portable computing device having a transmissive LCD display.

FIG. 8 is a flow chart that depicts, in detail, the sequence of steps performed by the data processing means 102 on a portable computing device 100 having a transmissive LCD display 122.

Initially, at step 500, the portable computing device 100 is in an inactive state, such as a sleep state; and the display backlight 182 and the keyboard backlight 183 are at a minimum intensity, such as off. Typically, the light controller 184 flashes the event notification lamp 166 to notify the user that the portable computing device 100 is not off, but is instead inactive.

At step 502, the data processing means 102 waits for activity on the data input means, such as a depression of a key on the keyboard 132, rotation of the thumbwheel 148 or depression of the escape key 160. If the user of the portable computing device 100 activates the data input means, the data processing means 102 exits the inactive state, and processing transitions to step 504.

Alternately, in one variation, the data processing means 102 exits the inactive state in response to activity occurring on one of the computer programs 158. For instance, the data processing means 102 may exit the inactive state when an e-mail message or a telephone call is received on the portable computing device 100.

Typically, when the user depresses a key on the keyboard 132 or the escape key 160, the data processing means 102 processes the activity as a key stroke, and uses the key stroke as a data input to one of the computer programs 158. Further, typically when the user rotates or depresses the thumbwheel 148, the data processing means 102 processes the activity as a navigation input to the operating system or one of the computer programs 158. However, at step 502, since the activity on the data input means is used to exit the portable computing device 100 from the inactive state, the data processing means 102 suppresses the normal effect (data input, navigation input) of the activity.

At step 504, the light controller 184 determines the ambient light level at the portable computing device 100. The light controller 184 determines the ambient light intensity by measuring the intensity of the light in the light guide 168, 174 with the light sensor 170. Preferably, the light controller 184 determines the ambient light intensity during the interval between flashes of the event notification lamp 166, ie. when the light controller 184 has momentarily extinguished the event notification lamp 166.

At step 506, the light controller 184 compares the determined light level against a first predetermined threshold level. Typically, the first predetermined threshold level is intermediate an illumination level corresponding to exposure to sunlight, and an illumination level corresponding to dusk.

If the determined light level is greater than the first predetermined threshold level, at step 508 the light controller 184 sets the intensity of the display backlight 182 to a first intensity level. Typically, the first intensity level is the maximum display backlight intensity. In addition, preferably the light controller 184 keeps the keyboard/keypad backlight 183 off.

If the determined light level is not greater than the first predetermined threshold level, at step 510 the light controller 184 compares the determined light level against a second predetermined threshold level. Typically, the second predetermined threshold level is intermediate the illumination level corresponding to dusk, and an illumination level corresponding to night.

If the determined light level is less than the second predetermined threshold level, at step 512 the light controller 184 sets the intensity of the display backlight 182 to a third intensity level. Typically, the third intensity level is a dim backlight intensity that is slightly greater than the minimal/off intensity level. The dim backlight intensity is sufficient to allow the information displayed on the display 122 to be viewed at night, without "blinding" the user of the portable computing device 100.

In addition, preferably the light controller 184 sets the intensity of the keyboard/keypad backlight 183 to a dim keyboard intensity (brighter than off). As above, the dim keyboard intensity is sufficient to allow the key identifier information printed on the keys to be viewed at night, without "blinding" the user of the portable computing device 100.

However, if the determined light level is not less than the second predetermined threshold level (but is less than the first predetermined threshold level), at step 514 the light controller 184 sets the intensity of the display backlight 182 to a second intensity level. Typically, the second intensity level is a level intermediate the first (maximum) backlight intensity and the third (dim) backlight intensity. The second backlight intensity is sufficient to allow the information displayed on the display 122 to be viewed at dusk, again without "blinding" the user of the portable computing device 100.

In addition, preferably the light controller 184 sets the intensity of the keyboard/keypad backlight 183 to a bright backlight intensity (typically the maximum backlight intensity).

Thereafter, at step 516, the data processing means 102 waits a first predetermined time period for activity at the data input means (eg. pressing a key on the keyboard 132, rotating the thumbwheel 148 or depressing the escape key 160) or for an e-mail message or a telephone call being received on the portable computing device 100. If the data processing means 102 detects such activity within the first predetermined time period (typically about 10 seconds), processing returns to step 504.

However, if the first predetermined time period expires without any such activity, at step 518 the light controller 184 begins to gradually reduce the intensity of the display backlight 182, so as to provide a warning to the user of the portable computing device 100 that the display backlight is about to be turned off. In addition, preferably the light controller 184 also turns off the keyboard backlight 183.

Thereafter, at step 520, the data processing means 102 waits a second predetermined time period for activity at the data input means or for an e-mail message or a telephone call being received on the portable computing device 100. If the data processing means 102 detects such activity within the second predetermined time period (typically about 15 seconds), processing returns to step 504.

However, if the second predetermined time period expires without any such activity, at step 522 the light controller 184 turns off the display backlight 182.

Thereafter, at step 524, the data processing means 102 waits a third predetermined time period for activity at the data input means or for an e-mail message or a telephone call being received on the portable computing device 100. If the data processing means 102 detects such activity within the third predetermined time period (typically about 60 seconds), processing returns to step 504.

However, if the third predetermined time period expires without any such activity at the data input means, at step 526 processing returns to step 502 and the portable computing device 100 returns to the inactive/sleep state.

Figure 9:
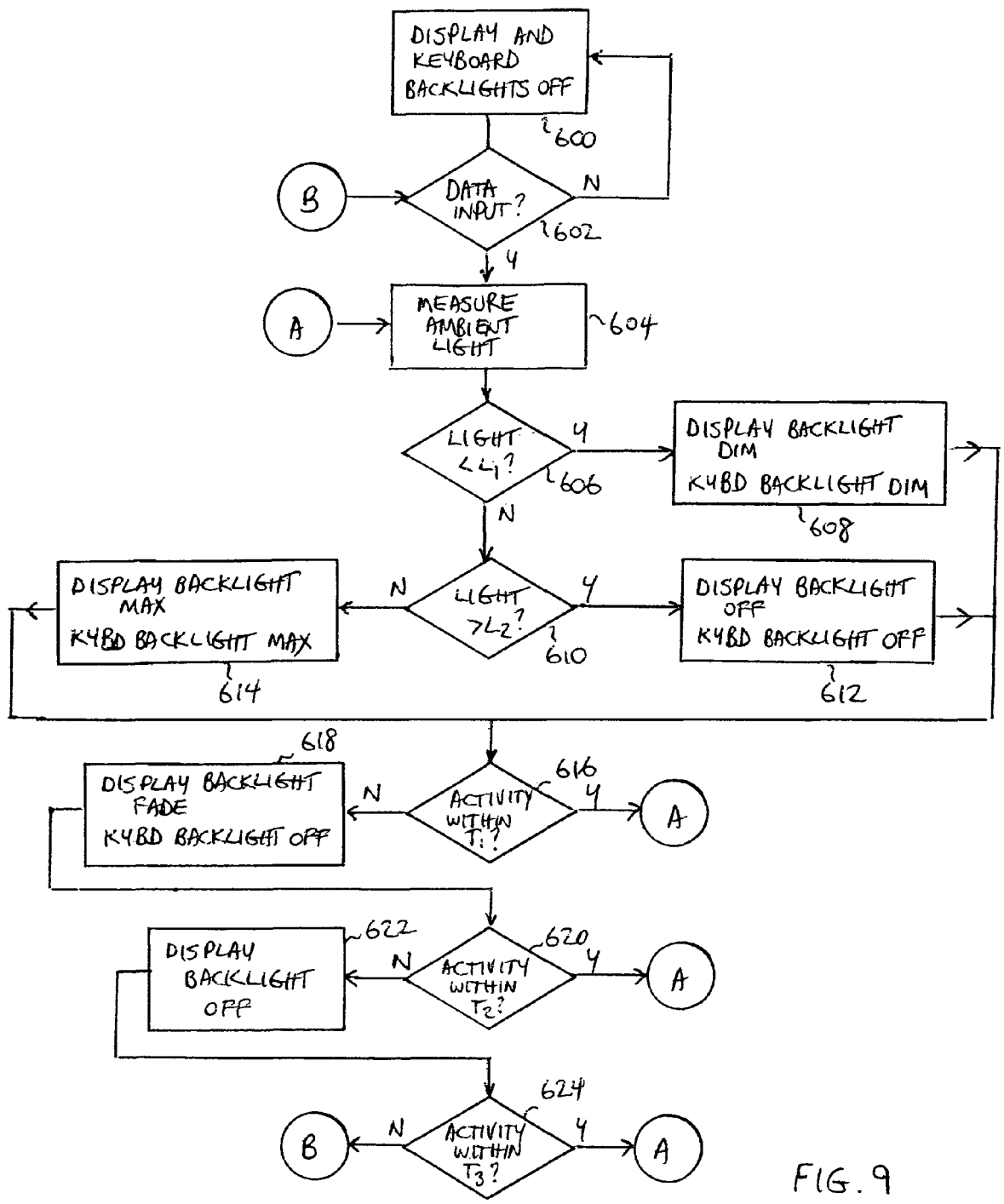
FIGS. 9a and 9b together comprise a flowchart depicting, in detail, the method of illumination control of the display device implemented in the portable computing device having a reflective, trans-reflective or transmissive LCD display.

FIG. 9 is a flow chart that depicts, in detail, the sequence of steps performed by the light controller 184 on a portable computing device 100 having a reflective, trans-reflective or transmissive LCD display 122.

Initially, at step 600, the portable computing device 100 is in an inactive state, such as a sleep state; and the display backlight 182 and the keyboard backlight 183 are at a minimum intensity, such as off.

At step 602, the data processing means 102 waits for activity on the data input means, such as by pressing a key on the keyboard 132, rotating the thumbwheel 148 or depressing the escape key 160. If the user of the portable computing device 100 activates the data input means the portable computing device 100 exits the inactive state, and processing jumps to step 604.

Typically, when the user depresses a key on the keyboard 132 or the escape key 160, the data processing means 102 processes the activity as a key stroke, and uses the key stroke as a data input to one of the computer programs 158. Further, typically when the user rotates or depresses the thumbwheel 148, the 1 data processing means 102 processes the activity as a navigation input to the operating system or one of the computer programs 158. However, at step 602, since the activity on the data input means is used to exit the portable computing device 100 from the inactive state, the data processing means 102 suppresses the normal effect (data input, navigation input) of the activity.

At step 604, the light controller 184 determines the ambient light level at the portable computing device 100, via the ambient light sensor 170. At step 606, the light controller 184 compares the determined light level against a first predetermined threshold level. Typically, the first predetermined threshold level is intermediate an illumination level corresponding to dusk, and an illumination level corresponding to night.

If the determined light level is less than the first predetermined threshold level, at step 608 the light controller 184 sets the intensity of the display backlight 182 to a second intensity level. Typically, the second intensity level is a dim backlight intensity that is slightly greater than the minimal/off intensity level. The dim backlight intensity is sufficient to allow the information displayed on the display 122 to be viewed at night, without "blinding" the user of the portable computing device 100.

In addition, preferably the light controller 184 sets the intensity of the keyboard/keypad backlight 183 to a dim keyboard intensity (brighter than off). As above, the dim keyboard intensity is sufficient to allow the key identifier information printed on the keys to be viewed at night, without "blinding" the user of the portable computing device 100.

If the determined light level is not less than the first predetermined threshold level, at step 610 the light controller 184 compares the determined light level against a second predetermined threshold level. Typically, the second predetermined threshold level is intermediate an illumination level corresponding to exposure to sunlight, and the illumination level corresponding to dusk.

If the determined light level is greater than the second predetermined threshold level, at step 612 the light controller 184 sets the intensity of the display backlight 182 to a third intensity level. Typically, the third intensity level is the minimal/off intensity level. In addition, preferably the light controller 184 turns off the keyboard/keypad backlight 183.

However, if the determined light level is not greater than the second predetermined threshold level (but is not less than the first predetermined threshold level), at step 614 the light controller 184 sets the intensity of the display backlight 182 to a first intensity level. Typically, the first intensity level is the maximum backlight intensity. The first backlight intensity is sufficient to allow the information displayed on the display 122 to be viewed at dusk, again without "blinding" the user of the portable computing device 100.

In addition, preferably the light controller 184 sets the intensity of the keyboard/keypad backlight 183 to a bright backlight intensity (typically the maximum backlight intensity).

Thereafter, at step 616, the data processing means 102 waits a first predetermined time period for activity at the data input means (eg. pressing a key on the keyboard 132, rotating the thumbwheel 148 or depressing the escape key 160) or for an e-mail message or a telephone call being received on the portable computing device 100. If the data processing means 102 detects such activity within the first predetermined time period (typically about 10 seconds), processing returns to step 604.

However, if the first predetermined time period expires without any such activity, at step 618 the light controller 184 begins to gradually reduce the intensity of the display backlight 182, so as to provide a warning to the user of the portable computing device 100 that the display backlight is about to be turned off. In addition, preferably the light controller 184 also turns off the keyboard backlight 183.

Thereafter, at step 620, the data processing means 102 waits a second predetermined time period for activity at the data input means or for an e-mail message or a telephone call being received on the portable computing device 100. If the data processing means 102 detects such activity within the second predetermined time period (typically about 15 seconds), processing returns to step 604.

However, if the second predetermined time period expires without any such activity, at step 622 the light controller 184 turns off the display backlight 182.

Thereafter, at step 624, the data processing means 102 waits a third predetermined time period for activity at the data input means or for an e-mail message or a telephone call being received on the portable computing device 100. If the data processing means 102 detects such activity within the third predetermined time period (typically about 60 seconds), processing returns to step 604.

However, if the third predetermined time period expires without any such activity, processing returns to step 602 and the portable computing device 100 returns to the inactive/sleep state.

Variations on the foregoing embodiments are envisaged. For instance, in one variation, rather than the first, second and third intensity levels being fixed, the data processing means 102 allows the user of the portable computing device 100 to set the intensity levels through the data input means (such as through the thumbwheel 148). In another variation, rather than the first and second threshold levels being fixed, the data processing means 102 allows the user of the portable computing device 100 to set the threshold levels through the data input means (such as through the thumbwheel 148).

In yet another variation, the light controller 184 allows the user to turn the display backlight 182 on (maximum intensity) or off, by momentarily depressing and releasing the function key 146. In still another variation, the light controller 184 allows the user to cycle through each combination of display backlight intensity level and keyboard backlight intensity level by momentarily depressing and releasing the function key 146. In other variation, the light controller 184 allows the user to terminate the automatic dimming (at steps 518, 618) by momentarily depressing and releasing the function key 146.

In another variation, the event notifier 162 includes the event notification lamp 166 and the light conduit 168 (of the first embodiment), and the light guide 174 (of the second embodiment), with the ambient light sensor 170 being coupled to both the light conduit 168 and the light guide 174. With this variation, the ambient light sensor 170 is able to measure the ambient light proximate the lens 164 and the display 122, thereby providing a more accurate assessment of the ambient light level.

The present invention is defined by the claims appended hereto, with the foregoing description being merely illustrative of a preferred embodiment of the invention. Those of ordinary skill may envisage certain modifications to the foregoing embodiments which, although not explicitly discussed herein, do not depart from the scope of the invention, as defined by the appended claims.

We claim:

1. A portable computing device, comprising:
 a housing including an external surface;
 a display device supported by the housing and including a light source configured to enhance visualization of information rendered on the display device;
 an event notifier including an event notification lamp configured to flash on and off during an inactive state, the event notifier further configured to determine an intensity of ambient light external to the housing upon occurrence of a predefined event during an interval between a first flash and a second flash of the event notification lamp; and
 a light controller coupled to the event notifier and the light source, the light controller being configured to adjust an intensity of light emitted by the light source in accordance with the intensity of ambient light determined by the event notifier during the interval between the first flash and the second flash.

2. The portable computing device according to claim 1, further including data input means, and the predefined event comprises user activity at the data input means.

3. The portable computing device according to claim 2, wherein the data input means comprises one of a keyboard key and a thumbwheel.

4. The portable computing device according to claim 1, wherein the predefined event comprises a message received at the portable computing device.

5. The portable computing device according to claim 1, further including:
 a light conduit, wherein the light conduit comprises a speaker grille aperture.

6. The portable computing device according to claim 1, further including:
 a light conduit, wherein the light conduit comprises a microphone grille aperture.

7. The portable computing device according to claim 1, wherein the display device comprises a liquid crystal display, and the light source comprises a display backlight.

8. In a portable computing device comprising a housing, and an event notifier, an event notification lamp, and a display device disposed within the housing, a method of controlling visualization of information rendered on the display device, the method comprising:
 flashing the event notification lamp on and off during an inactive state;
 determining, by the event notifier, an intensity of ambient light external to the housing upon occurrence of a predefined event during an interval between a first flash and a second flash of the event notification lamp; and
 adjusting an intensity of light emitted by the display device in accordance with the intensity of ambient light determined by the event notifier during the interval between the first flash and the second flash.

9. The method according to claim 8, wherein the portable computing device includes data input means, and the predefined event comprises user activity at the data input means.

10. The method according to claim 9, wherein the data input means comprises one of a keyboard key and a thumbwheel.

11. The method according to claim 8, wherein the predefined event comprises a message received at the portable computing device.

12. A non-transitory computer-readable medium carrying computer processing instructions for a portable computing device, the portable computing device comprising a housing, an event notifier, an event notification lamp, a display device and data processing means disposed within the housing, when executed the computer processing instructions causing the data processing means to:
 flash the event notification lamp on and off during an inactive state;
 determine, by the event notifier, an intensity of the ambient light upon occurrence of a predefined event during an interval between a first flash and a second flash of the event notification lamp; and
 adjust an intensity of light emitted by the display device in accordance with the intensity of ambient light determined by the event notification lamp during the interval between the first flash and the second flash.

* * * * *